US011858002B1

(12) United States Patent
Bissett

(10) Patent No.: US 11,858,002 B1
(45) Date of Patent: Jan. 2, 2024

(54) SHAKER SCREEN ASSEMBLY WITH MOLDED SUPPORT RAIL

(71) Applicant: Continental Wire Cloth, LLC, Jenks, OK (US)

(72) Inventor: James R. Bissett, Broken Arrow, OK (US)

(73) Assignee: Continental Wire Cloth, LLC, Jenks, OK (US)

( * ) Notice: Subject to any disclaimer, the term of this patent is extended or adjusted under 35 U.S.C. 154(b) by 54 days.

(21) Appl. No.: 17/838,783

(22) Filed: Jun. 13, 2022

(51) Int. Cl.
*B07B 1/48* (2006.01)
*B07B 1/46* (2006.01)

(52) U.S. Cl.
CPC .............. *B07B 1/48* (2013.01); *B07B 1/4672* (2013.01); *B07B 2201/02* (2013.01)

(58) Field of Classification Search
CPC ..... B07B 1/48; B07B 1/4672; B07B 2201/02; B07B 1/46; B07B 1/4663; B07B 1/4618; B07B 1/4609; B07B 1/4645
USPC ......................................... 209/363, 405, 412
See application file for complete search history.

(56) References Cited

U.S. PATENT DOCUMENTS

| | | | | |
|---|---|---|---|---|
| 4,582,597 | A | 4/1986 | Huber | |
| 6,601,709 | B2 | 8/2003 | Schulte, Jr. et al. | |
| 6,769,550 | B2 | 8/2004 | Adams et al. | |
| 6,789,680 | B2 | 9/2004 | Ward et al. | |
| 6,868,972 | B2 | 3/2005 | Seyffert et al. | |
| 6,910,587 | B2 | 6/2005 | Seyffert | |
| 6,920,942 | B2 | 7/2005 | Koederitz | |
| 6,936,092 | B2 | 8/2005 | Seyffert et al. | |
| 6,938,779 | B2 | 9/2005 | Burnett | |
| 6,955,262 | B2 | 10/2005 | Seyffert et al. | |
| 6,988,567 | B2 | 1/2006 | Burnett et al. | |
| 7,040,488 | B2 | 5/2006 | Seyffert et al. | |
| 7,080,960 | B2 | 7/2006 | Burnett | |
| 7,195,084 | B2 | 3/2007 | Burnett et al. | |
| 7,216,768 | B2 * | 5/2007 | Fisher ................ | B01D 33/0376 209/403 |
| 7,478,728 | B2 * | 1/2009 | Fisher ..................... | B07B 1/485 209/403 |
| 7,493,969 | B2 | 2/2009 | Burnett et al. | |
| 7,635,667 | B1 | 12/2009 | Brazzel | |
| 7,637,692 | B1 | 12/2009 | Rose | |

(Continued)

FOREIGN PATENT DOCUMENTS

WO 2004069374 A1 8/2004

OTHER PUBLICATIONS

Images of prior art shaker screen publicly available at least as early as Jan. 2021.

(Continued)

*Primary Examiner* — Gene O Crawford
*Assistant Examiner* — Muhammad Awais
(74) *Attorney, Agent, or Firm* — McAfee & Taft

(57) ABSTRACT

A shaker screen comprising a panel defining a plurality of openings therein, the panel having an upper surface and a lower surface. A plurality of mesh screens is attached to the panel, and separately formed side rails are connected to the panel at first and second sides thereof. The side rails have a connecting hook at a first end thereof and a receiving slot at a second end thereof. The receiving slot is configured to receive the connecting hook at the first end of a side rail of an adjacent shaker screen and the receiving slot is covered by the panel.

20 Claims, 9 Drawing Sheets

(56) References Cited

U.S. PATENT DOCUMENTS

| | | | | |
|---|---|---|---|---|
| 7,740,761 | B2 | 6/2010 | Bailey | |
| 7,896,162 | B2 | 3/2011 | Bailey | |
| 7,918,346 | B2 * | 4/2011 | Roppo | B07B 1/485 209/412 |
| 7,942,272 | B2 * | 5/2011 | Fisher | E21B 21/065 209/403 |
| 7,980,392 | B2 | 7/2011 | Larson et al. | |
| 8,127,837 | B1 | 3/2012 | Rose | |
| 8,133,164 | B2 | 3/2012 | Beebe et al. | |
| 8,172,740 | B2 | 5/2012 | El Dorry et al. | |
| 8,256,505 | B1 | 9/2012 | Rose | |
| 8,453,844 | B2 | 6/2013 | Bailey | |
| 8,485,250 | B1 | 7/2013 | Rose | |
| 8,556,083 | B2 | 10/2013 | Burnett | |
| 8,561,805 | B2 | 10/2013 | Scott et al. | |
| 8,622,220 | B2 | 1/2014 | Schulte, Jr. et al. | |
| 8,746,459 | B2 | 6/2014 | Scott et al. | |
| 9,073,104 | B2 | 7/2015 | Burnett et al. | |
| 9,079,222 | B2 | 7/2015 | Burnett et al. | |
| 9,199,278 | B2 | 12/2015 | Scott et al. | |
| 9,364,777 | B2 | 6/2016 | Burnett | |
| 9,677,353 | B2 | 6/2017 | Burnett | |
| 9,815,005 | B2 | 11/2017 | Burnett | |
| 10,041,314 | B2 | 8/2018 | McCraw | |
| 10,047,577 | B2 * | 8/2018 | Bailey | B07B 1/28 |
| 10,150,066 | B2 | 12/2018 | Burnett | |
| 10,166,574 | B2 | 1/2019 | Mitchell et al. | |
| 10,233,706 | B2 | 3/2019 | Zazula et al. | |
| 10,513,914 | B1 | 12/2019 | Rose | |
| 10,526,860 | B2 | 1/2020 | Rose | |
| 10,550,669 | B1 | 2/2020 | Rose | |
| 10,704,345 | B2 | 7/2020 | Zazula et al. | |
| 2016/0288171 | A1 | 10/2016 | Bissett | |

OTHER PUBLICATIONS

Images of prior art shaker machines publicly known at least as early as Jan. 2021.

* cited by examiner 70
96
98
88
88
88
74,76
82
72
88
68
92
78
94

SHAKER SCREEN ASSEMBLY WITH MOLDED SUPPORT RAIL

BACKGROUND

A vibratory shaker machine, sometimes referred to as a shale shaker or mud shaker (hereafter a "shaker machine"), is used in the oil and gas industry and other industries to separate solids from a mixture of solids and liquids. For example, shaker machines are commonly used in processes for reclaiming used oil and gas well drilling mud in order to separate rock, cuttings, and other solid particles from the mud before the used mud is further processed.

In operating a shaker machine, the mixture of solids and liquids is caused to flow onto and through a shaker screen assembly, which is removably attached to the shaker machine and functions to filter solids from the mixture of solids and liquids. In order to facilitate the filtration process and cause the separated solids to slide off the top of the shaker screen assembly as the process is carried out, the shaker screen assembly is caused to vibrate by the shaker machine. Usually, two or more shaker screen assemblies are positioned side by side on the shaker machine. Due to the strong vibratory forces and harsh environments to which shaker screen assemblies are subjected, they tend to wear out relatively quickly. As a result, in many applications, the shaker screen assemblies mounted to a shaker machine must be periodically replaced.

Certain of the shaker machines in the industry used to filter solids as described above use screens of either hook strip or pretensioned design. Hook strip screens are normally tensioned after being placed in the basket of a shaker. Hook strip screens have hook strips formed at opposed sides thereof. The hook strips are hooked around a tension rail. The tension rail is attached to the basket, and a tensioning mechanism is used to tension the hook strip screen and secure the screen to the basket. The tensioning mechanism will move the tension rail outwardly, towards the walls of the basket to apply tension to the screen. The hook strip screen is normally stretched over a crowned deck to generate a crowned, or arcuate profile. Mounting a hook strip screen can be time consuming and complex, such that replacement can create a significant amount of down time for the shaker machine in which it is used.

Pretensioned screens generally comprise one or more layers of mesh permanently bonded under tension onto a generally rigid steel and/or plastics material perforated plate support frame. Pretensioned screens are inserted into the basket and generally require no adjustment to the tension of the screen after insertion. The pretensioned screen is typically secured to a shaker machine by clamping it from above or below.

SUMMARY

In one aspect, a shaker screen is provided. The shaker screen in one embodiment comprises a panel defining a plurality of openings therein, the panel having an upper surface and a lower surface; a plurality of mesh screens attached to the panel; and separately formed side rails connected to the panel at first and second sides thereof, the side rails having a connecting hook at a first end thereof and a receiving slot at a second end thereof, the receiving slot configured to receive the connecting hook at the first end of a side rail of an adjacent shaker screen, the receiving slot being covered by the panel. Embodiments disclosed include:

Embodiment 1. A shaker screen comprising a panel defining a plurality of openings therein, the panel having an upper surface and a lower surface; a plurality of mesh screens attached to the panel; and separately formed first and second side rails connected to the panel at first and second sides thereof, the side rails having a connecting hook at a first end thereof and a receiving slot at a second end thereof, the receiving slot configured to receive the connecting hook at the first end of a side rail of an adjacent shaker screen, the receiving slot being covered by the panel.

Embodiment 2. The shaker screen of embodiment 1, the upper surface comprising a flat surface.

Embodiment 3. The shaker screen of either of embodiments 1 or 2, the panel comprising a crown-shaped panel between the first and second side rails.

Embodiment 4. The shaker screen of any of embodiments 1-3, the first and second side rails comprising triangularly shaped side rails with a plurality of ribs connecting two sides thereof.

Embodiment 5. The shaker screen of any of embodiments 1-4, the first and second side rails comprising a flat upper surface engaging the bottom surface of the panel; and an upwardly extending lip on an outer edge of the flat upper surface of the first and second side rails.

Embodiment 6. The shaker screen of embodiment 5, wherein the upwardly extending lip has a height substantially equal to a thickness of the panel.

Embodiment 7. The shaker screen of any of embodiments 5 or 6, an upper edge of the lip and the upper surface of the panel being substantially coplanar.

Embodiment 8. A shaker screen assembly comprising a first perforated panel having an upper surface and a lower surface, and having first and second sides; a plurality of mesh screens attached to the panel; first and second side rails connected to the first perforated panel and extending along a length of the first perforated panel at the first and second sides thereof, the first and second side rails having an upwardly extending connecting hook at a first end thereof and a receiving slot at a second end thereof, the receiving slots in the first and second side rails connected to the first perforated panel being covered by the first perforated panel; a second perforated panel having an upper surface and a lower surface; a plurality of mesh screens attached to the second perforated panel; first and second side rails connected to and extending along a length of the second perforated panel at the first and second sides thereof, the first and second side rails connected to the second perforated panel having a connecting hook at a first end thereof and a receiving slot at a second end thereof, the receiving slots in the first and second side rails connected to the second perforated panels being covered by the second perforated panel; and the connecting hooks on the first and second side rails connected to the first perforated panel being received in the receiving slots of the first and second side rails on the second perforated panel to connect the first and second perforated panels.

Embodiment 9. The screen assembly of embodiment 8, the first and second side rails connected to the first and second perforated panels comprising separately formed first and second side rails connected to the first and second perforated panels.

Embodiment 10. The screen assembly of any of embodiments 8 and 9, the first and second side rails connected to the first and second perforated panels comprising molded plastic side rails.

Embodiment 11. The screen assembly of any of embodiments 8-10, the upper surfaces of the first and second perforated panels comprising flat upper surfaces.

Embodiment 12. The screen assembly of any of embodiments 8-11, the first and second perforated panels being crowned.

Embodiment 13. A vibratory shaker comprising: a basket; the shaker screen assembly of any of embodiments 8-12 received in the basket; and inflatable air bladders engageable with the upper surfaces of the first and second perforated panels at the first and second sides thereof upon the inflation of the inflatable air bladders.

Embodiment 14. The shaker screen assembly of any of embodiments 8-12, the first and second side rails connected to the first and second perforated panels comprising generally triangularly shaped side rails.

Embodiment 15. A shaker screen comprising a first perforated panel having an upper surface and a lower surface; a plurality of mesh screens attached to the perforated panel; first and second separately formed triangularly shaped side rails connected to the first perforated panel at first and second sides thereof; a connecting hook at a first end of the first and second side rails; and a receiving slot defined in the first and second side rails at a second end thereof, the receiving slot in each of the first and second side rails being hidden by the first perforated panel, the receiving slots configured to receive connecting hooks of first and second side rails connected to a second perforated panel positioned adjacent the first perforated panel.

Embodiment 16. The shaker screen of embodiment 15, the first and second side rails connected to the first perforated panel having a lip extending upwardly from the upper surface thereof, the side edges of the first perforated panel abutting the lip on the first and second side rails.

Embodiment 17. The shaker screen of embodiment 16, the lip on the first and second side rails having a height substantially equal to a thickness of the first perforated panel.

Embodiment 18. A shaker screen assembly comprising first and second shaker screens as claimed in any of embodiments 15-17, the connecting hooks of the first shaker screen being received in the receiving slots of the second shaker screen.

Embodiment 19. The shaker screen of any of embodiments 15-17, the upper surface of the first perforated panel defining a bladder engagement surface at the sides thereof for engaging an inflatable air bladder on a shaker machine, the bladder engagement surface having no exposed openings into which the air bladder can extrude.

Embodiment 20. A shaker machine comprising a plurality of the shaker screens of embodiment 15 inserted therein.

BRIEF DESCRIPTION OF THE DRAWINGS

The drawings included with this application illustrate certain aspects of specific embodiments of the process disclosed herein. However, the embodiments disclosed herein, as shown by the drawings, should not be viewed as the exclusive embodiments. The subject matter disclosed herein is capable of considerable modifications, alterations, combinations, and equivalents in form and function, as will occur to those skilled in the art with the benefit of this disclosure. For example, the specific views in the drawings are not representative of the exact size of the items shown.

FIG. 13 is a view of the shaker screen from line 13-13 of FIG. 4.

DETAILED DESCRIPTION

Figure 1:
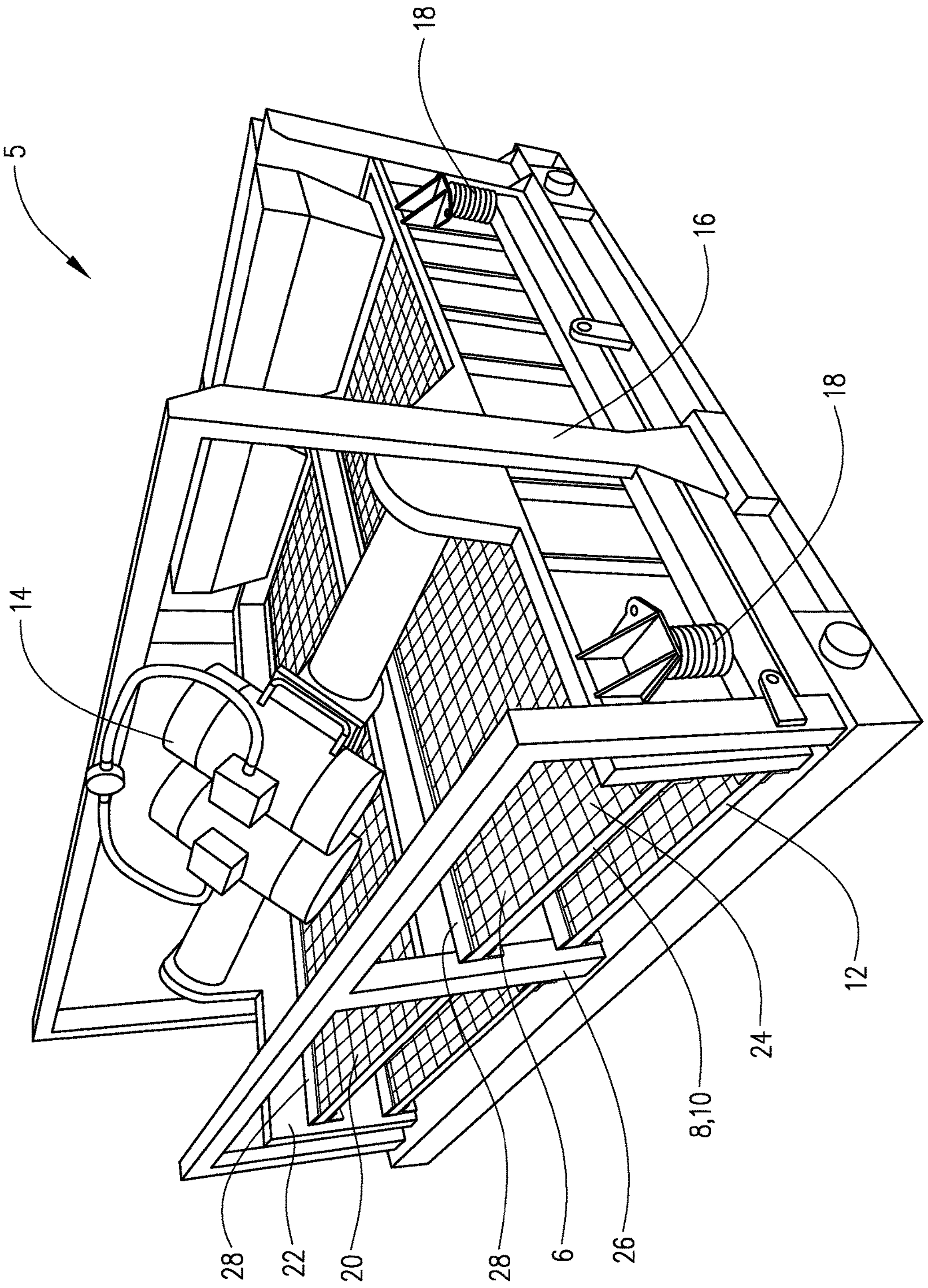
FIG. 1 is a schematic perspective view of a shaker machine.

The present disclosure may be understood more readily by reference to this detailed description as well as to the specific embodiments described herein. For simplicity and clarity of illustration, where appropriate, reference numerals may be repeated among portions of the drawings to indicate corresponding or analogous elements. In addition, numerous specific details are set forth in order to provide a thorough understanding of the disclosed subject matter and various embodiments described herein. However, it will be understood by those of ordinary skill in the art that the subject matter and embodiments described herein can be practiced without these specific details. In other instances, for example, components have not been described in detail so as not to obscure the related relevant feature being described. Also, the description is not to be considered as limiting the scope of the subject matter described herein. The drawings are not necessarily to scale and the proportions of certain parts may have been exaggerated to better illustrate details and features of the present disclosure.

As used herein and in the appended claims, terms describing the orientation of components such as top, bottom, lowermost, etc., are to be construed in view of the manner in which the components are oriented in the drawings included herewith.

As used herein and in the appended claims, an element or component that "comprises" or "includes" one or more specified components means that the element or component includes the specified component(s) alone, or includes the specified component(s) together with one or more additional components. An element or component that "consists of" one or more specified components means that the element or component includes only the specified component(s). An element or component that "consists essentially of" one or more specified components means that the element or component consists of the specified component(s) alone, or consists of the specified component(s) together with one or more additional components that do not materially affect the basic properties of the element or component. Whenever a range is disclosed herein, the range includes independently and separately every member of the range extending between any two numbers enumerated within the range. Furthermore, the lowest and highest numbers of any range shall be understood to be included within the range set forth.

In accordance with this disclosure, a shaker screen and a method of making a shaker screen are provided. As used herein and in the appended claims, a shaker machine refers to a vibratory shaker machine. A shaker screen refers to a vibratory shaker screen for use in connection with a shaker machine to separate solids from a mixture of solids and liquids.

Referring to FIG. 1, a shaker machine is described and generally designated by the reference number 5. Shaker machine 5 has a basket 6 into which shaker screens are inserted. Shaker machine 5 is of a type that may have multiple levels 8, which in the embodiment described may be two levels 10 and 12. While the described embodiment includes two levels, it is understood that a shaker machine 5 may include only one level, or may include more than two levels. A vibratory motor 14 may be mounted to the frame 16 of shaker machine 5 and springs 18 may be mounted in such a way as to control the vibration applied by the vibratory motors 14.

Figure 2:
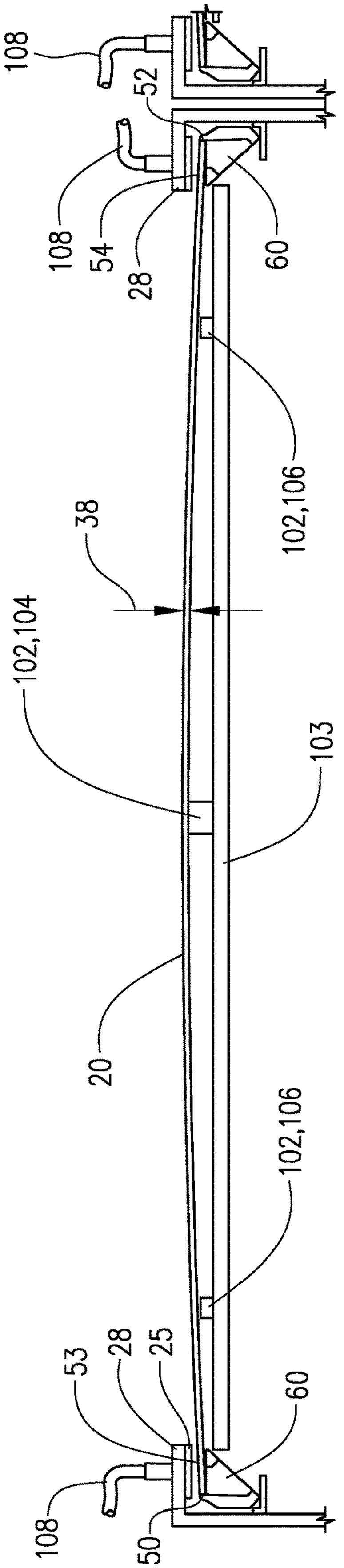
FIG. 2 is an end view showing a shaker screen inserted into a basket of a shaker machine.
Figure 3:
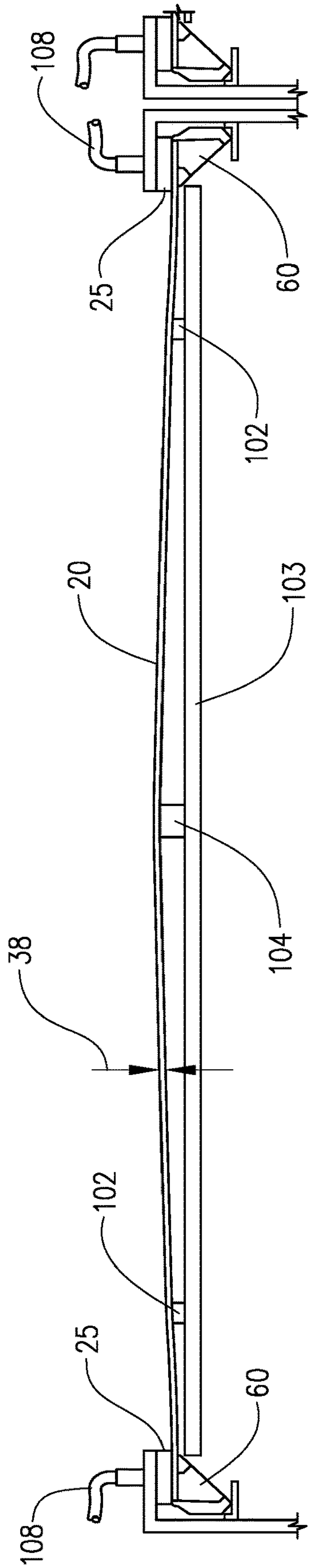
FIG. 3 is an end view showing the shaker screen depicted in FIG. 2 inserted into a basket of a shaker machine secured by inflatable bladders.

A shaker machine 5 of the type described can accommodate a plurality of shaker screens 20. For example, two shaker screens 20 may be inserted side by side on opposite sides 22 and 24 of a divider 26 in the shaker machine 5. In addition, a plurality of shaker screens 20 may be connected end to end for insertion into and removal from shaker machine 5. Two, three or more, shaker screens 20 may be connected end to end in each level 8, and on both sides 22 and 24 of shaker machine 5. Flanges 28 may be connected to frame 16 in shaker 5. Shaker screens 20 may be inserted adjacent flanges 28, and an air bladder 25 (seen for example in FIG. 2 and FIG. 3) will be attached to flanges 28. Air bladder 25 when inflated will apply a downward force to the top surface of the shaker screens 20 at the outer sides thereof.

Shaker screen 20 comprises a panel 30, with a plurality of openings 31 defined therein. Panel 30 may be referred to herein as a perforated panel 30. A screen member 32, which may be a single mesh screen or a plurality of layered mesh screens are attached to panel 30. The screen member 32 is attached in a manner known in the art. In one example, the screen member is heat bonded to panel 30. Other methods of attachment, such as glue or epoxy may be used. Panel 30 in one embodiment is fabricated from a metal such as, in a non-limiting example, steel. Panel 30 has a top surface 33 and a bottom surface 34. Top surface 33 is a smooth surface. Panel 30 has a thickness 38. Panel 30 has first end 40, second end 42 and defines a length 44 therebetween. Panel 30 has first side 46 and second side 48, and first and second peripheral side edges 50 and 52 respectively at the first and second sides 46 and 48 thereof. Top surface 33 has first and second bladder engagement surfaces 53 and 54 at the first and second sides 46 and 48 thereof. Bladder engagement surface 53 is defined on the portion of the top surface 33 between peripheral edge 50 and an edge 55 of the openings 31 in panel 30 at first side 46. Bladder engagement surface 54 is defined on the portion of the top surface 33 between peripheral edge 52 and an edge 56 of the openings 31 in panel 30 at second side 48 thereof. Bladder engagement surfaces 53 and 54 are contiguous surfaces with no openings into which an air bladder may pass, and which could cause deformation and damage to the air bladder 25. The only interruptions in bladder engagement surfaces 53 and 54 are the slight protrusions of fastener heads that attach side rails 60 to panel 30.

Side rails 60 comprise first and second side rails 62 and 64. First and second side rails 62 and 64 in one embodiment are mirror images of one another. The same identifying numbers will be used on both, except that the subscript “a” will be used for features on second side rail 64. Side rails 60 are generally triangularly shaped side rails. Side rails 60 have a first, or hook end 68 and a second, or receiving end 70.

Side rails 60 have a top leg 74 with a top surface 76, which is a flat surface. Top leg 74 has a length 72. A lip 78 extends upwardly from top surface 76 along the length 72 of top leg 74. Lip 78 has a height 80, which is substantially equal to the thickness 38 of panel 30. A side leg 82 is connected to top leg 74. Side leg 82 has a surface 84 which is a flat surface along the length thereof. Side leg 82 and top leg 74 define an angle 86 therebetween, which in the embodiment described is an acute angle which may be in the range of, and which in one embodiment is about forty-five degrees, but which can have a broad range of angles. A plurality of spaced apart ribs 88 connect top leg 74 and side leg 82 and provide strength to side rails 60. The generally triangular shape is formed by the top leg 74, side leg 82 and ribs 88.

Side rails 60 in one embodiment may be molded side rails formed from a thermoplastic material, such as a nylon composite. It is understood that separately formed side rails 60 may be made from other plastics and materials, such as a metal material. Side rails 60 are formed separately from panel 30, which makes the construction and assembly of shaker screens 20 considerably more efficient and economic than existing screens. Existing shaker screens for use as described herein are generally formed by bending the outer edge of a metal panel into a generally triangular shape such that it is integral to the panel. The processes for creating such a panel are more involved and time consuming that those necessary for screens 20.

Side rails 60 are connected to panel 30 with rivets 90 or other fasteners that connect panel 30 to top leg 74. A head of rivet 90 will protrude only slightly above top surface 33 of panel 30. A flange 92 at first end 68 of side rails 60 has an upwardly extending hook 94 connected thereto. Top leg 74 at second end 70 of side rails 60 has a receiving slot 98 defined therein.

Figure 4:
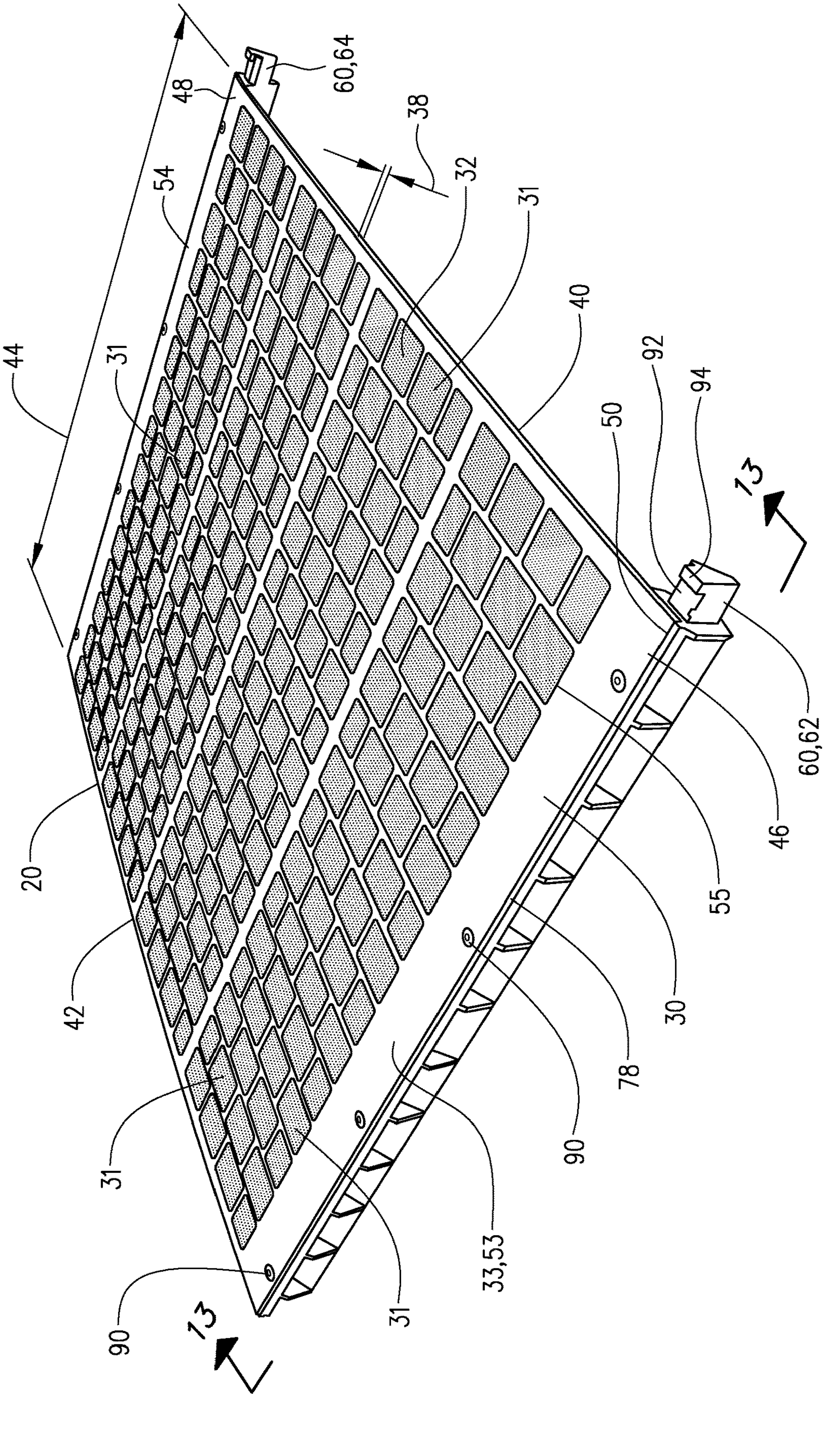
FIG. 4 is a top perspective view of the shaker screen.
Figure 5:
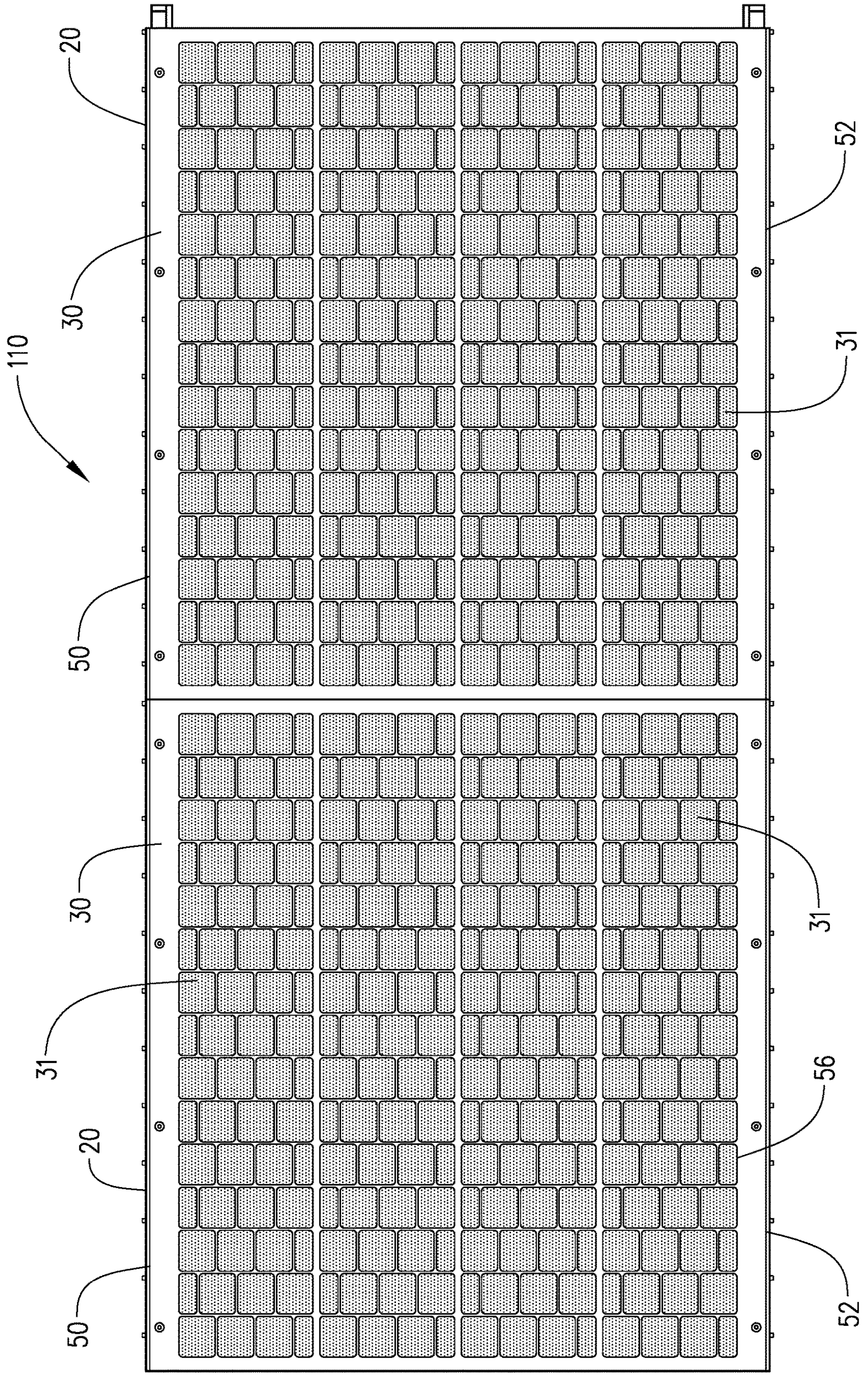
FIG. 5 is a top view of two of the shaker screens illustrated in FIG. 4 connected to one another.
Figure 6:
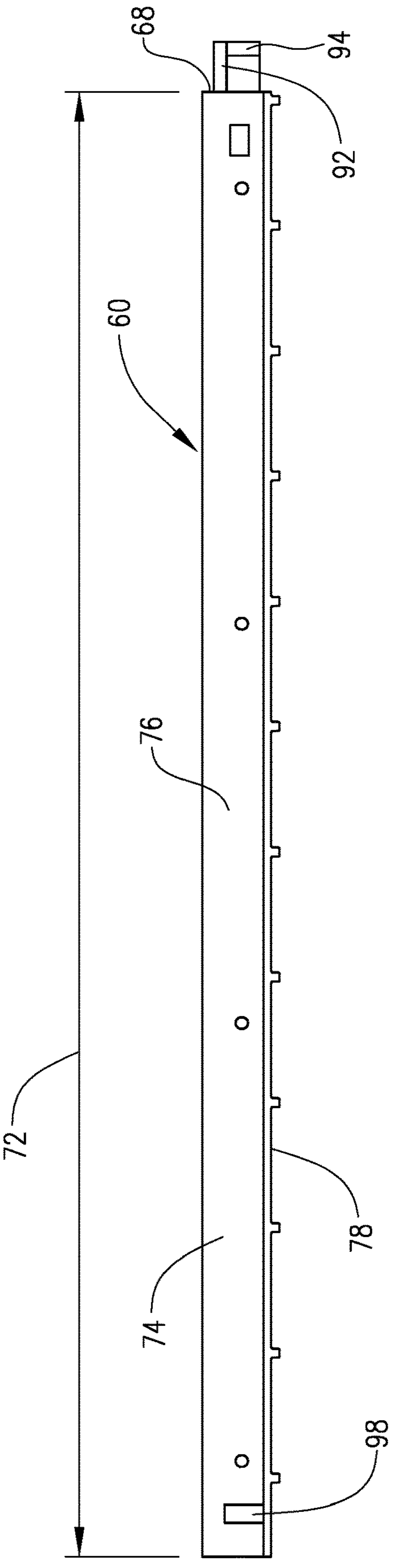
FIG. 6 is a top elevation view of a side rail of the shaker screen illustrated in FIG. 4.
Figure 7:
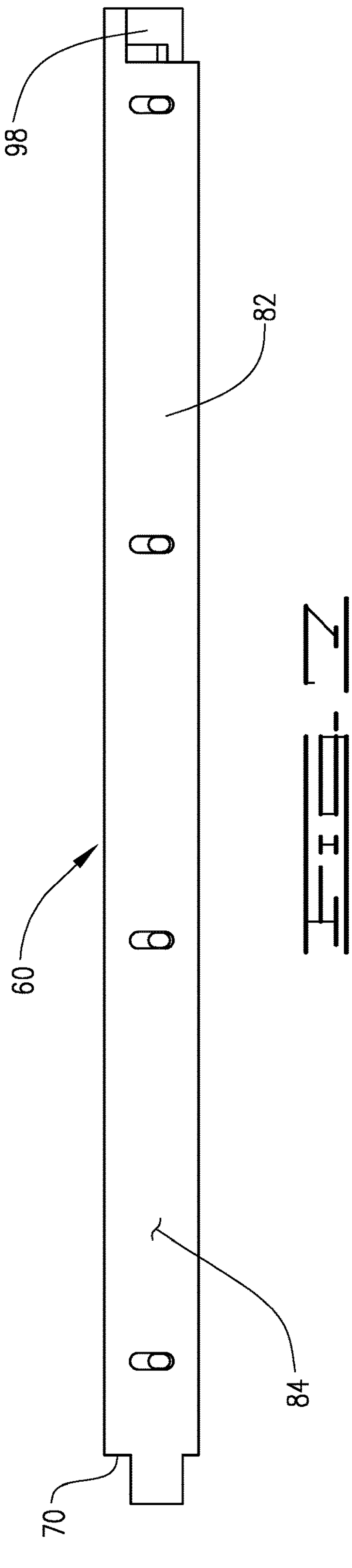
FIG. 7 is an elevation view of a side leg of the side rail of the shaker screen.
Figure 8:
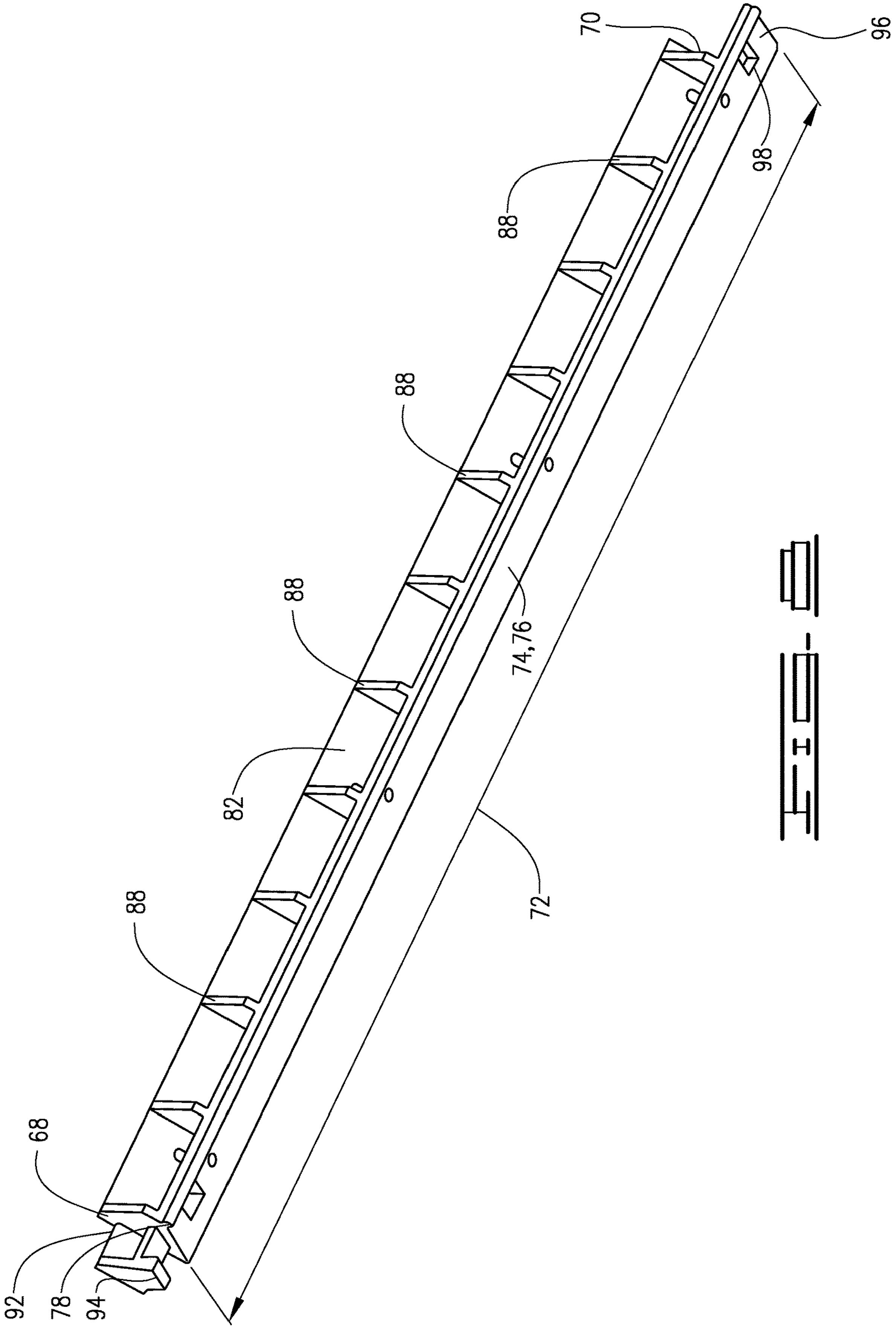
FIG. 8 is a perspective view of the side rail.
Figure 9:
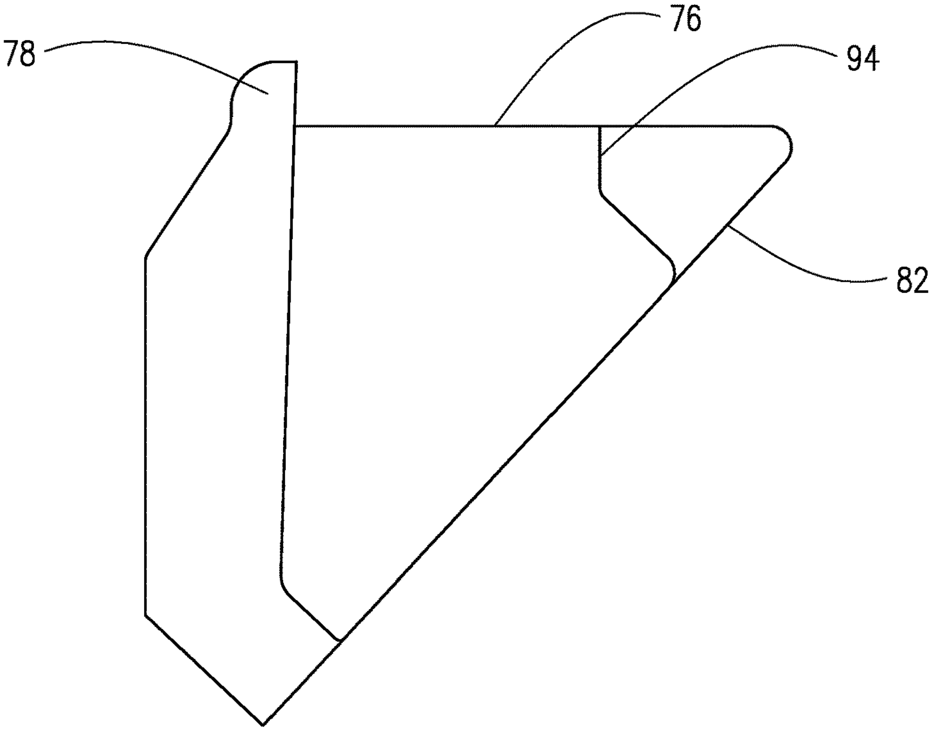
FIG. 9 is a view of the hook end of the side rail.
Figure 10:
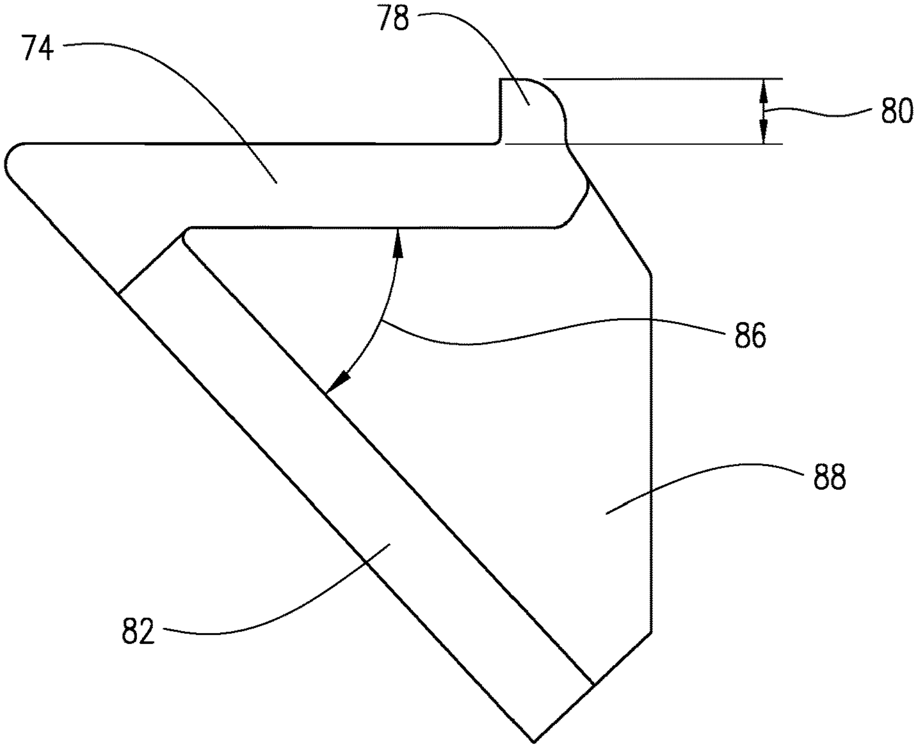
FIG. 10 is a view of the receiving slot end of the side rail
Figure 11:
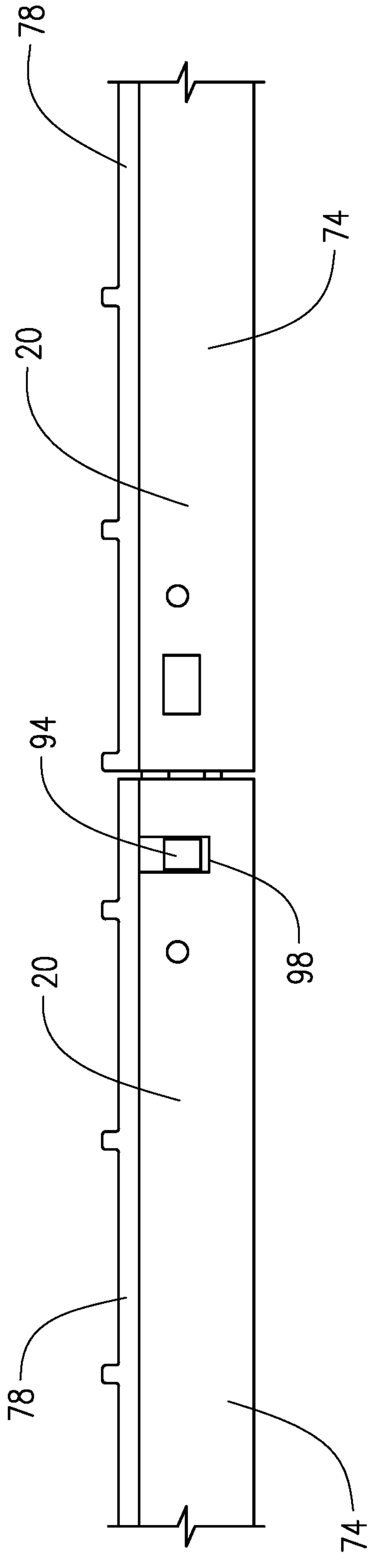
FIG. 11 is a top view of two side rails connected to one another.
Figure 12:
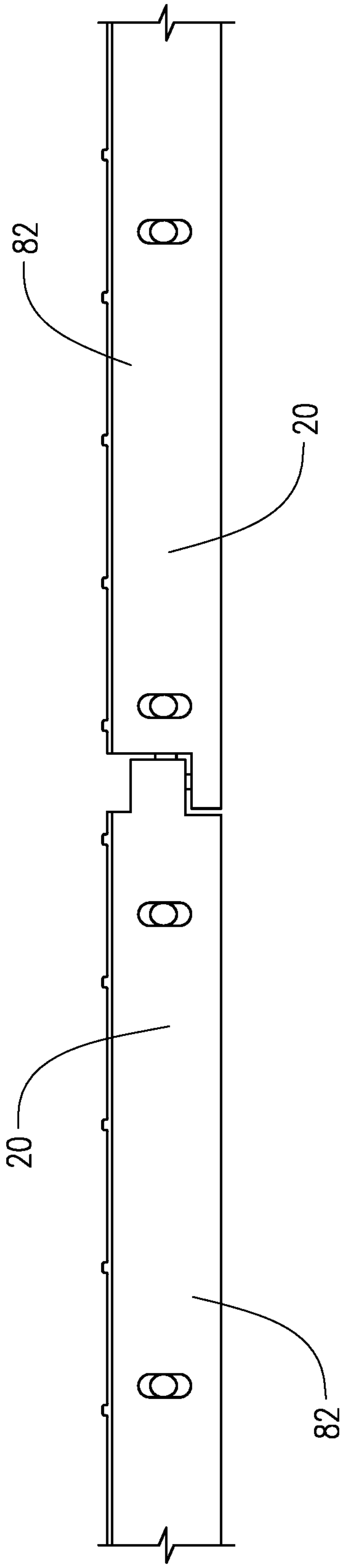
FIG. 12 is a view of the side legs of two side rails connected to one another.
Figure 11:
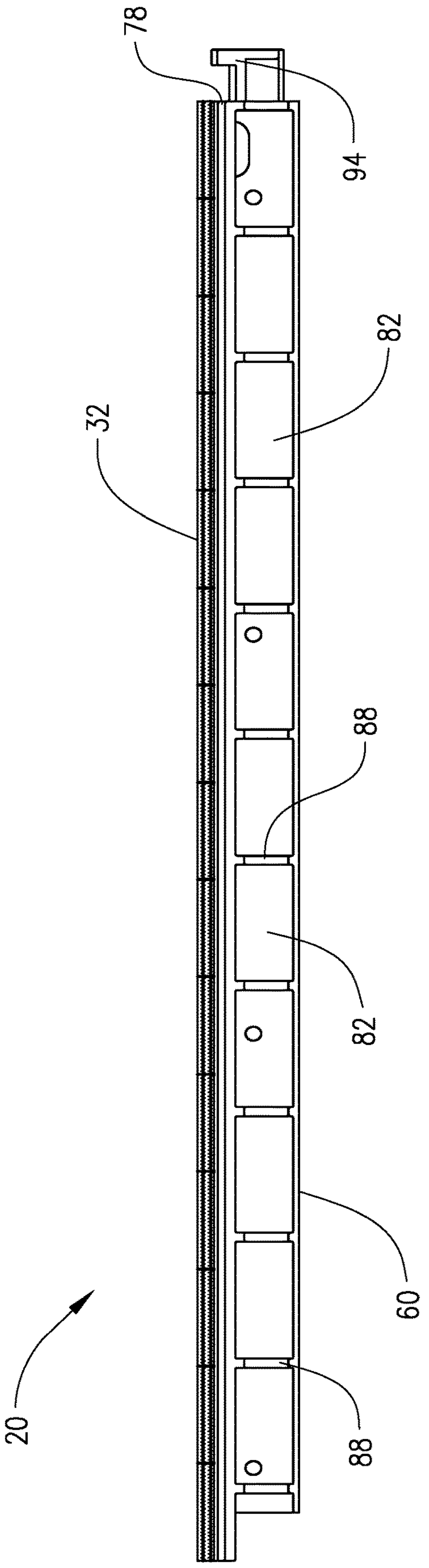

Shaker screens 20 thus comprise a panel 30 with mesh screens 32 attached thereto, and side rails 60 attached to the panel 30. When panel 30 and side rails 60 are connected, receiving slot 98 is covered by panel 30, so that there are no exposed openings in bladder engagement surfaces 53 and 54. Shaker screens 20 are shown in exemplary fashion inserted into a shaker 5 in the schematic perspective view of FIG. 1. FIG. 1 is an exemplary view looking directly into a basket 6 of shaker 5. As shown in FIG. 4, the bladder engagement surfaces 53 and 54 of top surface 33 are smooth and continuous, with no exposed openings into which an air bladder may be pushed, and thereby deformed or damaged. Shaker 5 may have a rigid crowning structure, which may be for example upstands, or ribs 102 spaced apart and supported by a support plate 103 that will be fixed to the frame 16 of shaker 5. A center rib 104 will be slightly taller than outer ribs 106, such that when the air bladder 25 is inflated to push down on panel 30, the shaker screen 20 is crowned and secured against the ribs 102. Air may be supplied to air bladders 25 through air hoses 108 from an air supply, such as an air compressor (not shown) or other air supply.

As noted above, it may be desirable to place shaker screens 20 side by side and end to end. To connect the shaker screens end to end to form a shaker screen assembly 110 with a plurality of shaker screens 20, the connecting hooks 94 at first end 68 of side rails 60 on a first shaker screen 20 are inserted into the receiving slots 98 on an adjacent second shaker screen 20. It is possible to connect as many shaker screens as desired in this fashion to achieve the desired length of shaker screen assembly 110 needed for a particular shaker machine. The air bladder 25 will be inflated once shaker screens 20 are inserted into shaker machine 5, and will press down on bladder engagement surfaces 53 and 54 to secure the shaker screens in the shaker machine 5. The screens are easily replaced as deflating the bladder 25 and pulling on the first shaker screen in a shaker screen assembly 110 will efficiently and effectively remove all of the shaker screens 20 in that assembly, since all are connected together with connecting hooks 94 and receiving slots 98.

A method of making a shaker screen may comprise, for example, providing a panel with mesh screens attached thereto and connecting separately formed side rails to the panel. The separately formed side rails may be molded side rails formed from a thermoplastic material, such as a nylon composite. The separately formed side rails may be connected to the panel with fasteners, such as rivets, or by other means. The method may further include inserting the shaker screen into a shaker machine, and securing the shaker screen with an inflatable air bladder.

Therefore, the shaker screen and shaker screen assembly disclosed herein are well adapted to attain the ends and advantages mentioned, as well as those that are inherent therein. The embodiments disclosed are illustrative only, as the shaker screen, shaker screen assembly, and method disclosed herein may be modified and practiced in different but equivalent manners, as will be apparent to those skilled in the art having the benefit of the teachings herein. Furthermore, no limitations are intended to the details of construction or design herein shown, other than as described in the claims below. It is therefore evident that the particular illustrative embodiments disclosed above may be altered or modified, and all such variations are considered within the scope and spirit of the present process. While the present shaker screen assembly, screen subassembly and method and the individual components and steps thereof may be described in terms of "comprising," "containing," "having," or "including" various steps or components, the process and system can also, in some examples, "consist essentially of" or "consist of" the various steps and components. Whenever a numerical range with a lower limit and an upper limit is disclosed, any number and any included range falling within the range are specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain ordinary meaning unless otherwise explicitly and clearly defined by the patentee.

What is claimed is:

1. A shaker screen comprising:
- a panel defining a plurality of openings therein, the panel having an upper surface and a lower surface;
- a plurality of mesh screens attached to the panel; and
- separately formed first and second side rails connected to the panel at first and second sides thereof, the side rails having a connecting hook at a first end thereof and a receiving slot at a second end thereof, the receiving slot configured to receive the connecting hook at the first end of a side rail of an adjacent shaker screen, the receiving slot being covered by the panel.

2. The shaker screen of claim 1, the upper surface of the panel comprising a flat surface.

3. The shaker screen of claim 2, the panel comprising a crown-shaped panel between the first and second side rails.

4. The shaker screen of claim 1, the first and second side rails comprising triangularly shaped rails with a plurality of ribs connecting two sides thereof.

5. The shaker screen of claim 1, the first and second side rails comprising:
- a flat upper surface engaging the bottom surface of the panel; and
- an upwardly extending lip on an outer edge of the flat upper surface of the first and second side rails.

6. The shaker screen of claim 5, wherein the upwardly extending lip has a height substantially equal to a thickness of the panel.

7. The shaker screen of claim 5, an upper edge of the lip and the upper surface of the panel being substantially coplanar.

8. A shaker screen assembly comprising:
- a first perforated panel having an upper surface and a lower surface, and having first and second sides;
- a plurality of mesh screens attached to the panel;
- first and second side rails connected to the first perforated panel and extending along a length of the first perforated panel at the first and second sides thereof, the first and second side rails connected to the first perforated panel having an upwardly extending connecting hook at a first end thereof and a receiving slot at a second end thereof, the receiving slots in the first and second side rails connected to the first perforated panel being covered by the first perforated panel;
- a second perforated panel having an upper surface and a lower surface;
- a plurality of mesh screens attached to the second perforated panel;
- first and second side rails connected to the second perforated panel and extending along a length of the second perforated panel at the first and second sides thereof, the first and second side rails connected to the second perforated panel having an upwardly extending connecting hook at a first end thereof and a receiving slot at a second end thereof, the receiving slots in the first and second side rails connected to the second perforated panel being covered by the first perforated panel; and
- the connecting hooks on the first and second side rails connected to the first perforated panel being received in the receiving slots of the first and second side rails connected to the second perforated panel, the receiving slots being covered by the first and second panels.

9. The screen assembly of claim 8, the first and second side rails connected to the first and second perforated panels comprising separately formed side rails connected to the first and second perforated panels.

10. The screen assembly of claim 9, the first and second side rails connected to the first and second perforated panels comprising molded plastic side rails.

11. The screen assembly of claim 8, the upper surfaces of the first and second perforated panels comprising flat upper surfaces.

12. The screen assembly of claim 11, the first and second perforated panels being crowned.

13. A vibratory shaker comprising:
- a basket;
- the shaker screen assembly of claim 8 received in the basket; and inflatable air bladders engageable with the upper surfaces of the first and second perforated panels at the first and second sides thereof upon the inflation of the inflatable air bladders.

14. The shaker screen assembly of claim 8, the first and second side rails connected to the first and second perforated panels comprising generally triangularly shaped side rails.

15. A shaker screen comprising:

a first perforated panel having an upper surface and a lower surface;

a plurality of mesh screens attached to the perforated panel;

first and second separately formed triangularly shaped side rails connected to the first perforated panel at first and second sides thereof;

a connecting hook at a first end of the first and second side rails; and a receiving slot defined in the first and second side rails at a second end thereof, the receiving slot in each of the first and second side rails being hidden by the first perforated panel, the receiving slots configured to receive connecting hooks of first and second side rails connected to a second perforated panel positioned adjacent the first perforated panel.

16. The shaker screen of claim 15, the first and second side rails connected to the first perforated panel having a lip extending upwardly from the upper surface thereof, the side edges of the first perforated panel abutting the lip on the first and second side rails.

17. The shaker screen of claim 16, the lip on the first and second side rails having a height substantially equal to a thickness of the first perforated panel.

18. A shaker screen assembly comprising first and second shaker screens as claimed in claim the connecting hooks of the first shaker screen being received in the receiving slots of the second shaker screen.

19. The shaker screen of claim 15, the upper surface of the first perforated panel defining a bladder engagement surface at the sides thereof for engaging an inflatable air bladder on a shaker machine, the bladder engagement surface having no exposed openings into which the air bladder can extrude.

20. A shaker machine comprising a plurality of the shaker screens of claim 15 inserted therein.

* * * * *